US008606924B2

(12) United States Patent
Gujral et al.

(10) Patent No.: US 8,606,924 B2
(45) Date of Patent: Dec. 10, 2013

(54) PRE-BURSTING TO EXTERNAL CLOUDS (75) Inventors: Karanbir Gujral, Pune (IN); Suhas Kelkar, Pune (IN)

(73) Assignee: BMC Software, Inc., Houston, TX (US)

( * ) Notice: Subject to any disclaimer, the term of this patent is extended or adjusted under 35 U.S.C. 154(b) by 261 days.

(21) Appl. No.: 13/074,996

(22) Filed: Mar. 29, 2011

(65) Prior Publication Data
US 2012/0254433 A1    Oct. 4, 2012

(51) Int. Cl.
*H04L 29/06* (2006.01)
(52) U.S. Cl.
USPC .................. 709/226; 370/254; 370/468
(58) Field of Classification Search
None
See application file for complete search history.

(56) References Cited

U.S. PATENT DOCUMENTS

| | | | |
|---|---|---|---|
| 8,037,187 B2* | 10/2011 | Dawson et al. | 709/226 |
| 2003/0046396 A1* | 3/2003 | Richter et al. | 709/226 |
| 2004/0030346 A1* | 2/2004 | Frey et al. | 606/99 |
| 2011/0016214 A1* | 1/2011 | Jackson | 709/226 |
| 2011/0137805 A1* | 6/2011 | Brookbanks et al. | 705/80 |
| 2011/0138048 A1* | 6/2011 | Dawson et al. | 709/226 |
| 2011/0145153 A1* | 6/2011 | Dawson et al. | 705/80 |
| 2012/0303396 A1* | 11/2012 | Winkler et al. | 705/7.11 |

* cited by examiner

*Primary Examiner* — Ian N Moore
*Assistant Examiner* — Latresa McCallum (57) ABSTRACT

In a cloud computing environment customers of the cloud believe they have instantaneous access to unlimited resources however to satisfy this with finite resources there are times when resources could have to be acquired from an external cloud with potentially different security capabilities and performance capabilities. A method and system are therefore disclosed to reduce cost incurred while scaling to an external cloud to meet short term demand and to take into account security and performance requirements of customers. The proposed method and system provide automation and prediction capabilities to help with the decision of growing cloud resources or temporarily becoming a hybrid cloud. By "pre-bursting" the cloud in anticipation of a cloud burst the growth in resources can be predicted and performed (with security and load balancing in mind) prior to actual cloud consumer requests.

17 Claims, 5 Drawing Sheets

PRE-BURSTING TO EXTERNAL CLOUDS

BACKGROUND

Today's enterprise systems are beginning to utilize cloud computing resources more frequently. Cloud computing resources offer computation, software, data access, and storage services that do not require end-user knowledge of the physical location and configuration of the system that delivers the services. Parallels to this concept can be drawn with the electricity grid where end-users consume power resources without any understanding of the component devices in the grid required to provide the service. Cloud computing is a natural evolution of the widespread adoption of virtualization, service-oriented architecture, autonomous and utility computing. Details are abstracted from end-users, who no longer have need for expertise in, or control over, the technology infrastructure "in the cloud" that supports them.

Cloud computing describes a new supplement, consumption, and delivery model for Information Technology (IT) services based on Internet protocols, and typically involves provisioning of dynamically scalable and often virtualized resources. Cloud computing is a byproduct and consequence of the ease-of-access to remote computing sites provided by the Internet. The ease-of-access frequently takes the form of web-based tools or applications that users can access and use through a web browser as if the remote service were a program installed locally on their own computer.

The National Institute of Standards and Technology (NIST) provides a somewhat more objective and specific definition:

"Cloud computing is a model for enabling convenient, on-demand network access to a shared pool of configurable computing resources (e.g., networks, servers, storage, applications, and services) that can be rapidly provisioned and released with minimal management effort or service provider interaction."

The term "cloud" can be thought of as a metaphor for the Internet, based on the cloud drawing used in the past to represent the telephone network, and later to depict the Internet in computer network diagrams as an abstraction of the underlying infrastructure it represents. Typical cloud computing providers deliver common business applications online that are accessed from another Web service or software like a Web browser, while the software and data are stored on servers.

Most cloud computing infrastructures consist of services delivered through common centers and built on servers. Clouds often appear as single points of access for consumers' computing needs. Commercial offerings are generally expected to meet quality of service (QoS) requirements of customers, and typically include service level agreements (SLAs).

In a corporate environment there can be available both internal cloud resources and external cloud resources or perhaps even a mixture of these (hybrid cloud). Internal clouds comprise a computing-like environment of resources within the boundaries of an organization and typically available for exclusive use by the organization. External clouds comprise a computing-like environment of resources external to the boundaries of the organization. Although it often is, an external cloud is not necessarily a public cloud. Some external clouds make their cloud infrastructure available to specific other organization (typically at a cost) and not to the public at-large.

When a cloud nears or reaches its capacity there may be a "cloud burst." A cloud burst has both a positive and negative meaning. In the positive sense, cloud burst refers to the dynamic deployment of a software application that runs on internal organizational compute resources to a public or external cloud to address a spike in demand that cannot be satisfied by the original cloud alone. In the negative sense, a cloud burst refers to the failure of a cloud computing environment due to the inability to handle a spike in demand and thus the request for resources is not satisfied.

In a cloud computing environment, customers of the cloud believe they have instantaneous access to unlimited resources. To satisfy this with finite resources there are times when resources could have to be acquired from an external or another internal cloud. Different clouds might have different security capabilities, performance capabilities, and associated cost.

Existing cloud burst systems simply act as routers for requests, deciding which ones are provisioned locally, and which ones are provisioned on the external cloud. Today's cloud burst strategies do not attempt to reduce cost by using mechanisms like service broking, reservations etc. Also, today's cloud burst strategies do not provide a cost-benefit analysis of bursting or provide data about the benefits of this approach versus not bursting or increasing resource redundancy in the internal cloud.

To solve these and other issues, a method and system are provided to predict and reduce cost incurred while scaling to another cloud to meet short term demand and to take into account security and performance requirements of customers. In one embodiment, the proposed method and system provide automation and prediction capabilities to help with the decision of growing cloud resources or temporarily becoming a hybrid cloud. By "pre-bursting" the cloud in anticipation of a cloud burst the growth in resources can be predicted and performed (with security in mind) prior to actual cloud consumer requests.

DETAILED DESCRIPTION

The present disclosure is described in the context of a plurality of internal networks primarily serviced by one internal cloud. When a burst of the internal cloud is forecast, a plurality of external clouds or perhaps other internal clouds could be selected from to logically join with the original internal cloud to satisfy a short-term spike in required resources. Although the present disclosure generally describes concepts in relation to an embodiment with one internal and two external clouds, this is merely for simplicity of disclosure, any number of internal clouds and external clouds could be combined and/or analyzed according to concepts of this disclosure.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the information technology support system field having the benefit of this disclosure.

While unlimited is a goal promised by a cloud computing model, there exist technical limitations to delivering on this goal because a cloud is inherently made up of a finite set of resources. These resources can be expanded as necessary. In times of growth it is sometimes possible to predict and expand the cloud according to growth; however, the rate at which infrastructure can be provisioned and configured sometimes falls behind demand requests. Also, in times of a short-term spike it might not be desirable to actually expand the resources of the cloud but instead "borrow" resources from an external cloud. A hybrid cloud is a cloud that scales into another external or internal cloud. A consumer of the cloud is not aware and typically is not concerned with how the cloud services their request for infrastructure. A method and system are therefore provided to reduce the cost incurred while scaling to another cloud to meet short term demand, account for security and performance, and, to possibly automate the decision of growing cloud resources or temporarily becoming a hybrid cloud.

In addition to performing analysis to reduce cost, another disclosed benefit is the potential simplification of the re-balancing problems associated with cloud bursting. Re-balancing problems could render cloud bursting ineffective, and in some cases re-balancing could affect SLAs of applications provisioned before the shortfall.

By "pre-bursting" the cloud in anticipation of a cloud burst, the growth in resources can be predicted and performed prior to actual cloud consumer requests. Also, the cloud burst model has another problem to account for in that new requests may have security or service level agreement requirements that must be satisfied. It should be expected that the internal cloud satisfies these requirements and when planning a cloud burst the internal cloud could be re-balanced to make sure that resources allocated from the external cloud are provided only to consumers whose security and SLA requirements are still satisfied by the external cloud while leaving other customers on resources from the internal cloud only. Therefore, a pre-burst system and method to plan ahead for a cloud burst, while taking into account both cost and customer requirements, would be desirable.

This disclosure additionally describes the use of reservations on external cloud resources to augment short-term capacity via a service broker. Capacity management and planning tools can be used to extrapolate resource need and match these needs against resource availability. Resource needs can be computed using factors like usage trending and reservations. Resource availability can take into account planned capacity additions via pre-bursting. Recall, pre-bursting refers to increasing cloud capacity prior to an actual cloud burst.

When a shortfall is foreseen, extra capacity can pro-actively be reserved in the external cloud (pre-bursting). The choice of the external cloud to use can be governed by a service broker that uses reverse auctions to get the best deal. The broker can use factors like resource compatibility, cost, duration etc. to make an intelligent reservation decision. Planning tools can decide how much to reserve, potentially keeping a fine balance between reserving capacity that might be wasted; and the cost of on-demand allocation if reservation is too conservative.

A reverse auction is a type of auction in which the roles of buyers and sellers are reversed. In an ordinary auction (also known as a forward auction), buyers compete to obtain a good or service, and the price typically increases over time. In a reverse auction, sellers compete to obtain business, and prices typically decrease over time.

Reverse auction is a strategy used by many purchasing and supply management organizations for spend management, as part of strategic sourcing and overall supply management activities. In a typical auction, the seller puts an item up for sale. Multiple buyers bid for the item, and one or more of the highest bidders buy the goods at a price determined at the conclusion of the bidding. In a reverse auction, a buyer puts a contract out for bid, either using specialized software or through an online marketplace. Multiple sellers offer bids on the item, competing to offer the lowest price that meets all of the specifications of the bid. As the auction progresses, the price decreases as sellers compete to offer lower bids than their competitors.

Bidding can be performed in real-time via the Internet and often results in a dynamic, competitive process. This helps achieve rapid downward price pressure that is not normally attainable using traditional static paper-based bidding processes. The buyer may award the contract to the seller who bid the lowest price. Or, a buyer may award contracts to suppliers who bid higher prices depending upon the buyer's specific needs with regards to quality, lead-time, capacity, or other value-adding capabilities.

Another possible consideration is the timing of the pre-burst. If pre-bursting is done sufficiently before the expected shortfall, the placement engine (decides where consumer requests for resources are placed) may require no modifications and simply adjust to the extra capacity. This procedure could remove the need to re-balance (move customers around within could resources) and potentially avoid problems inherent in re-balancing. Pre-bursting at the optimal time could let the placement engine adjust, so that the cost of pre-bursting could also be reduced.

Figure 1:
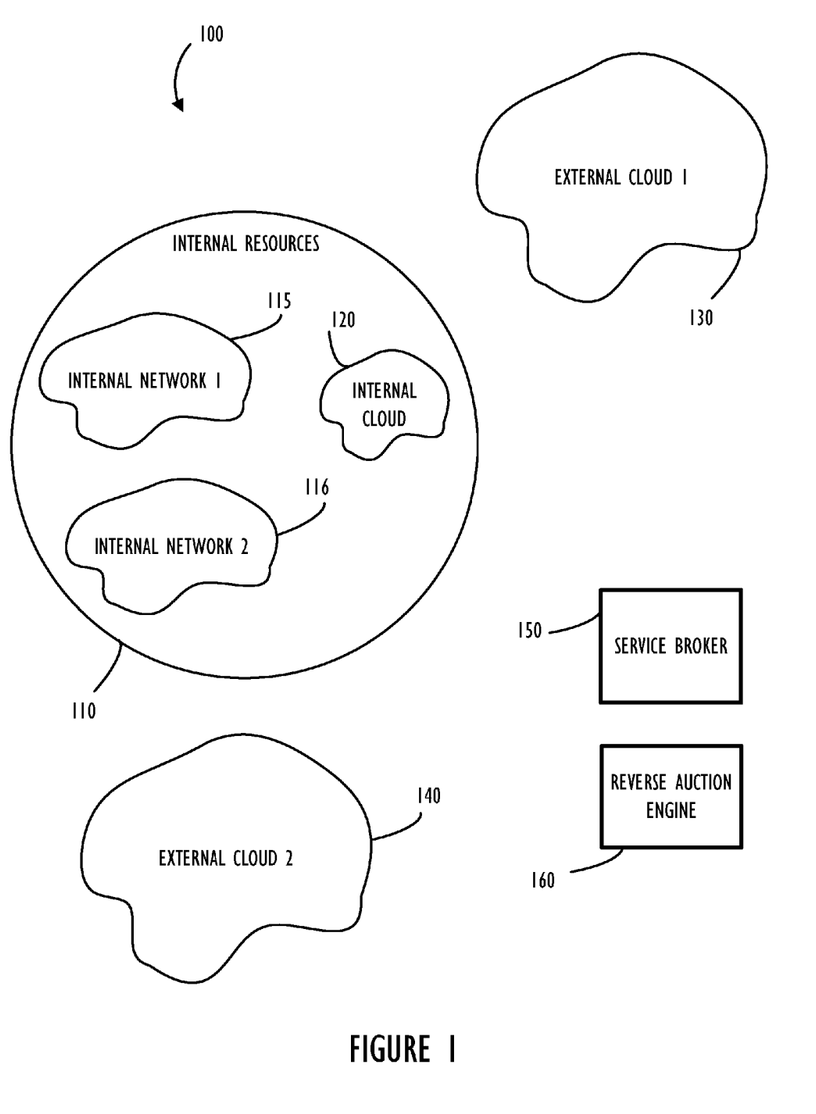
FIG. 1 illustrates, in block diagram form, an example of internal networks serviced by an internal cloud and external clouds which could be used to form a hybrid cloud according to one disclosed embodiment.

Referring now to FIG. 1, diagram 100 illustrates a set of internally managed resources 110 comprising internal network 1 (115) and internal network 2 (116) each of which are serviced by cloud resources provided by internal cloud 120. Internal cloud 120 would typically be designed to take into account security requirements of computers and services provided by applications on each of the internal networks 115 and 116. When resources on internal cloud 120 are predicted to have a shortfall, a request to a service broker 150 could be made to reserve resources to cover the shortfall. To ensure a competitive price, reverse auction engine 160 could perform a reverse auction across a plurality of external cloud vendors (e.g., 130 and 140) which would bid to provide resources to temporarily form a hybrid cloud with internal cloud 120 for the expected duration of the shortfall. Also, because of the planning via a pre-burst strategy the security and quality of service provided by external cloud vendors may be taken into consideration when assessing potential cost savings.

Figure 2:
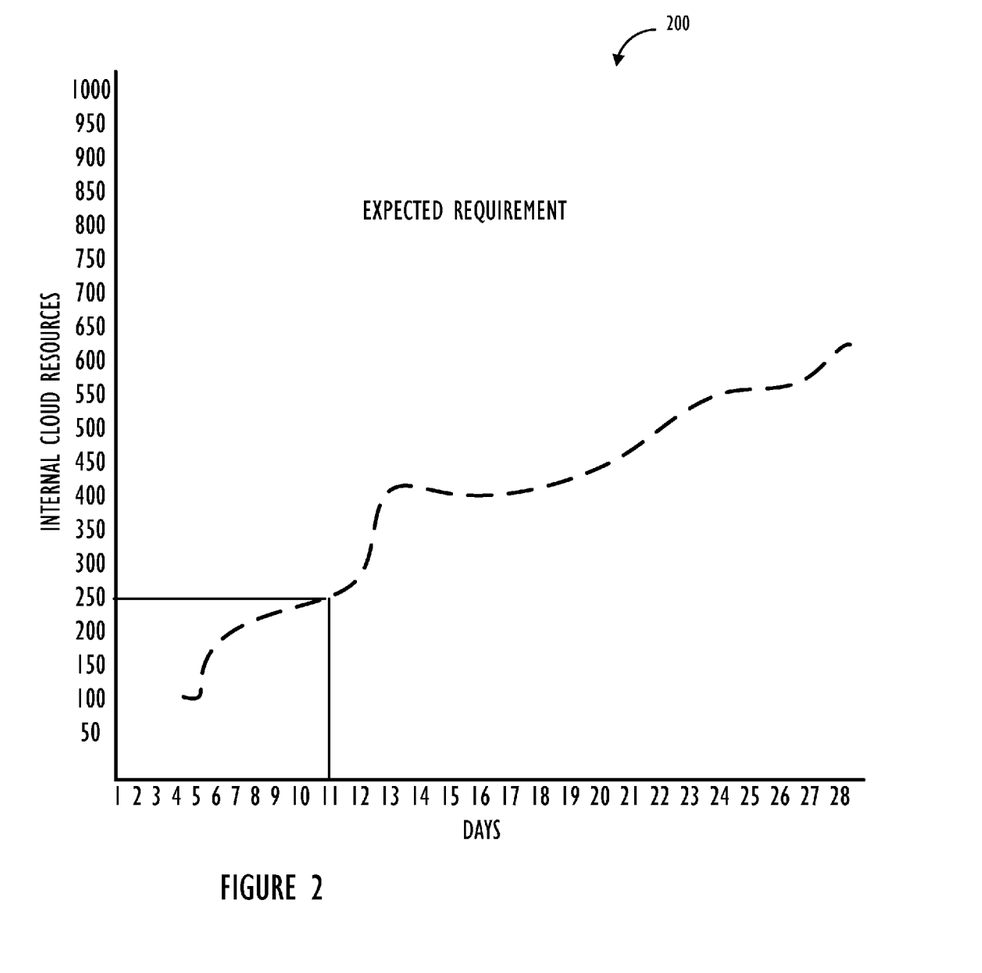
FIG. 2 illustrates a graph depicting one example of expected requirements of internal cloud resources as the need for resources grows over time.
Figure 3:
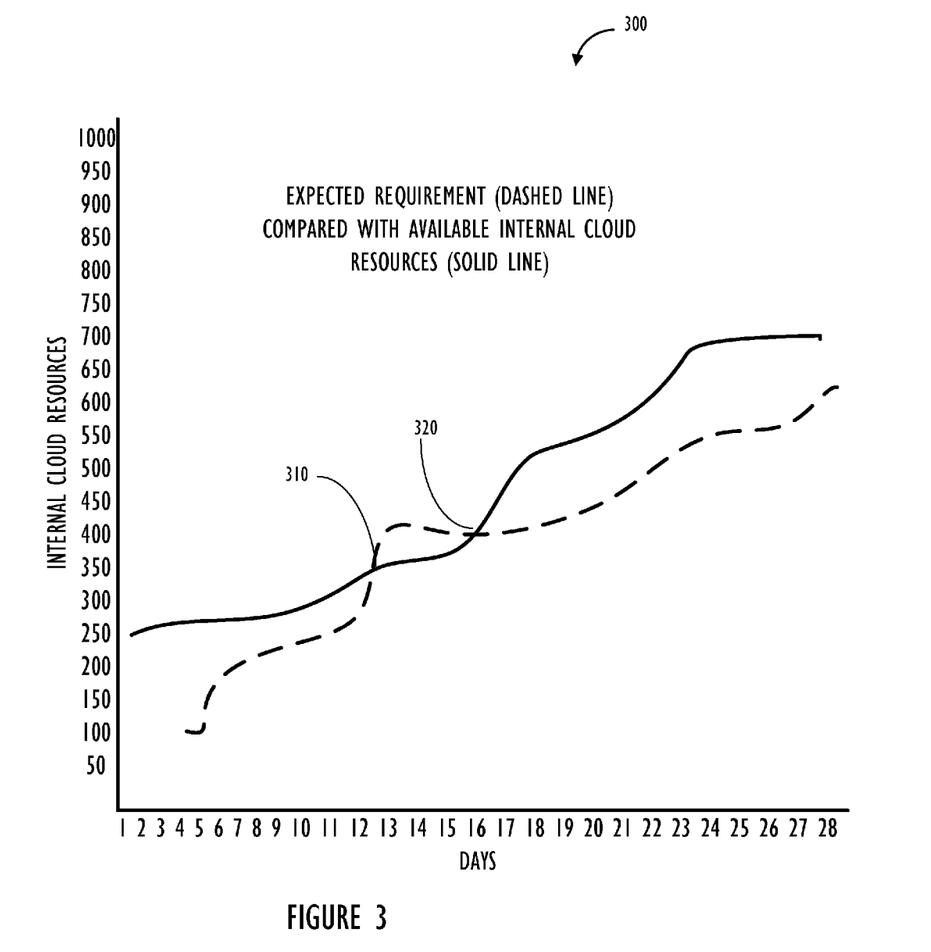
FIG. 3 illustrates a graph depicting the expected requirement of FIG. 2 versus available internal cloud resources over time.

Referring now to FIGS. 2 and 3, example graph 200 of expected requirements of planned usage requests against internal cloud resources versus time is shown in FIG. 2. As shown in graph 200 on day 11 about 250 units of a particular resource (or composite of all resources) are expected to be required from internal cloud resources. Note that the need for cloud resources (like disk storage) could continue to grow over time as shown in graph 200 but resources such as compute resources (e.g., CPU time) may actually fluctuate up and down more dramatically with a likely upward trend over time. Graph 300 in FIG. 3 shows an additional line representing available cloud resources (solid line) and their planned availability over time. The available capacity changing over time reflects an expected increase in resources. The timing of increasing resources includes the time for procurement as well as configuring the resources.

From the information shown in graph 300, it can be seen that beginning at point 310 and continuing to point 320 there will be a planned shortfall of resources in the internal cloud. Given this information, a pre-burst according to one disclosed embodiment could be performed on internal cloud (e.g., 120 of FIG. 1) to allow a service broker and reverse auction process to commence and hopefully reduce cost involved with covering the identified shortfall on days 12-16 (between 310 and 320). Additionally, because this shortfall is identified ahead of time balancing the allocation of resources can be taken into account as part of the pre-burst.

If the pre-burst is performed before the expected shortfall, the allocation of appropriate resources to the external cloud can be balanced. A placement engine (used to allocate resources from a cloud) could consider the pre-burst as standard capacity augmentation as it reflects a bulk addition of capacity. If enough time is allocated in the pre-burst model to allow for turn-around of requests (requests completing and new requests arriving) the placement engine could automatically balance the usage of the new cloud capacity. If however, the pre-burst capacity is only added at the time of shortfall (310) a likely result could be requests provisioned at inappropriate locations (i.e., not the most desirable cloud) requiring later re-allocation of those provisioned requests. Of course, the re-allocation would result in a cost and may also impact SLAs associated with provisioned resources.

By way of example, consider the following:
Existing capacity of the cloud is 'Z' resources.
Expected shortfall (amount of pre-burst) is 'Y' resources.
Average length of request for cloud is 'X' which could be computed from historical data and may change over time.
Time of expected shortfall is "T".
Assuming equitable distribution of incoming requests then leads to:

$$\text{Start of pre-burst} = T - (X*Y/Z)$$

If the pre-burst is performed ahead of time in this manner, the placement engine should have time to automatically balance the requests. Requests that can be provisioned on the external cloud can automatically go to the external cloud, possibly obviating the need for re-balancing at or after the time of shortfall.

There are several factors to consider when calculating the cost and making a decision on whether to pre-burst or not. For example, the cost of reserving the required resources on the external cloud (e.g., via a service broker) could be identified. The reservation time required could also be identified and the reservation time should include additional time added if automatic balancing (discussed above) is going to be used. Additionally, the expected cost of procuring resources via on-demand booking as needed to cover the expected shortfall and the "cost" of rejecting requests for services during the period of capacity shortage (e.g., if a pre-burst or burst were not performed at all) could be considered. Some of these costs are monetary and some of the costs include soft factors like potential loss of customers and reputation if services are not provided at all or within a pre-determined SLA. An example calculation for these factors could look like:

$$\text{Cost of not bursting} = \text{Loss of profit on rejected requests} + \text{Loss of reputation} + \text{Loss of customers}$$

$$\text{Where Loss of reputation} = X*\text{Expected annual rate of revenue growth;}$$

and $$\text{Loss of customers} = \text{Average annual revenue per customer}*(Y*\text{number of customers whose requests were rejected}).$$

Where X is a percentage estimate of reputation impact and Y is a percentage estimate of customers leaving based on a rejected request.

Along with these factors, policies defined for the cloud could be taken into account. The policies comprise a definition of the overall business goals of the cloud setup. If policies require that no requests should be rejected, only the cost factors need be considered against each other. If the policies identify a cost limit for resource requirement, or leeway for request fulfillment based on the request type, consideration of these policies should be taken into account when making a decision on pre-bursting. After considering the above factors a decision could be made between, at least the following choices:
cost of pre-bursting to the external cloud;
relative benefits over using on-demand bursting; and
relative benefits over not bursting to the external cloud at all.

Figure 4:
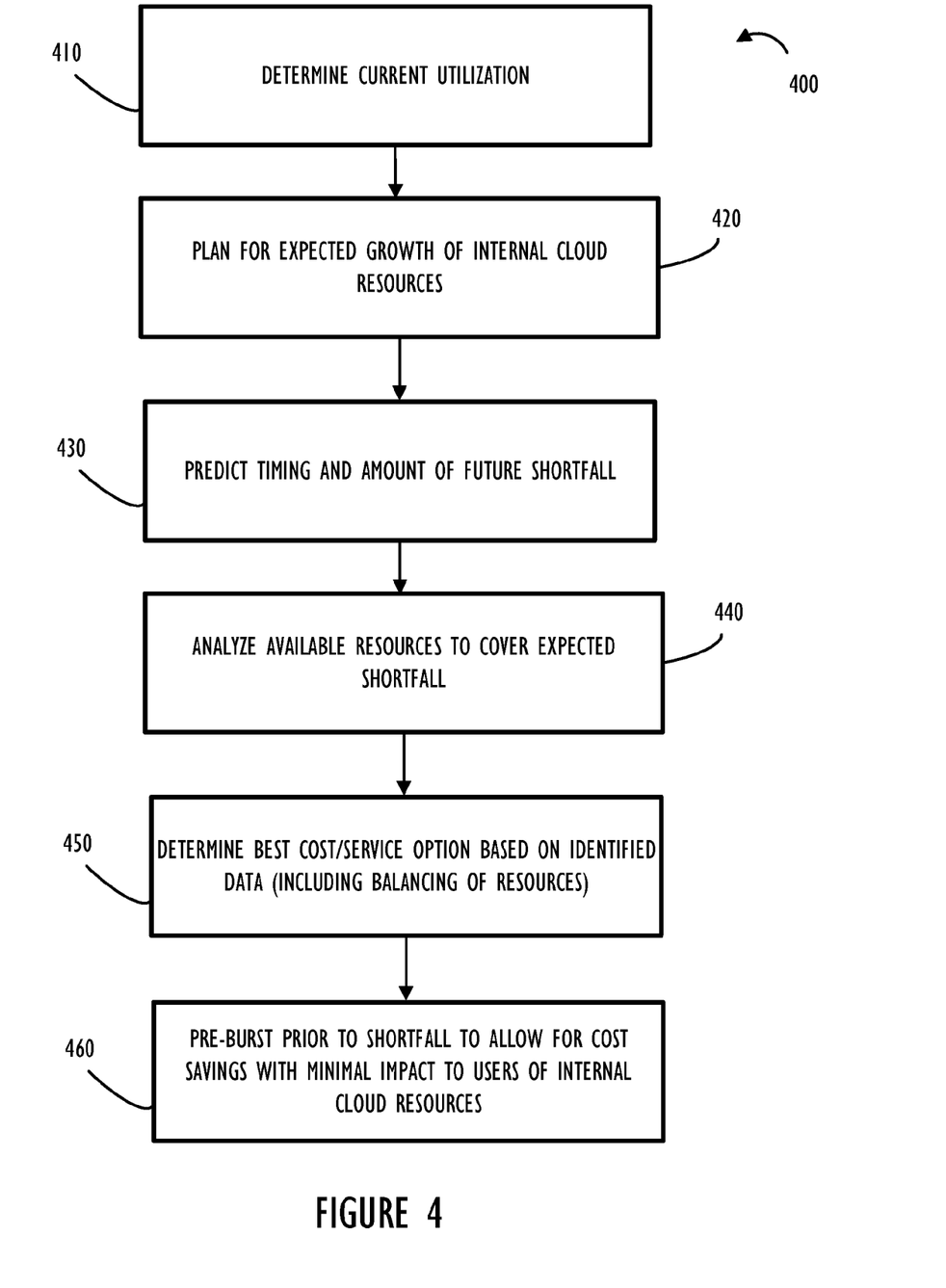
FIG. 4 illustrates, in flowchart form, an embodiment of addressing a cloud pre-burst according to one disclosed embodiment.

Referring now to FIG. 4, a flowchart 400 illustrates an example process for pre-bursting according to an embodiment of this disclosure. Beginning at block 410 current utilization of cloud resources could be determined. At block 420 reserved resources versus available capacity accounting for expected growth of internal cloud resources could be determined. Given these two pieces of composite information, a predicted timing of an expected shortfall could be determined at block 430. At block 440 analyses could be performed of all available internal and external resources to cover the expected shortfall. This analysis could include initiating a reverse auction through a service broker to determine expected cost of external resources. At block 450 a cost analysis (e.g., as described above) could be performed and can include the expected cost or cost savings regarding balancing of resources consumed from the hybrid cloud. Finally, at block 460 a pre-burst could be performed to allow for cost savings with minimal impact to users of the cloud resources or optionally not performed based on the above analysis.

Figure 5:
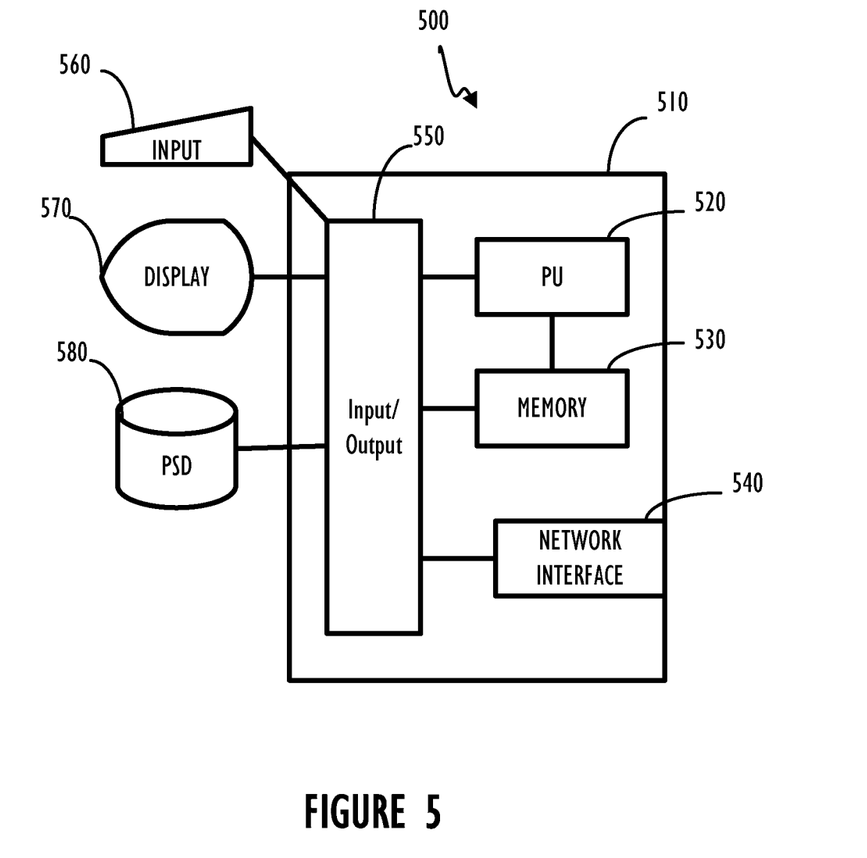
FIG. 5 illustrates, in block diagram form, an example computing device suitable for being programmed to perform all or part of each of the disclosed embodiments.

Referring now to FIG. 5, example computing device 500 is shown. One or more example computing devices 500 may be included in a mainframe or distributed computer (neither shown). Example computing device 500 comprises a programmable control device 510 which may be optionally connected to input devices 560 (e.g., keyboard, mouse, touch screen, etc.), display 570 and/or program storage device (PSD) 580 (sometimes referred to as a direct access storage device DASD). Also, included with program control device 510 is network interface 540 for communication via a network with other computing and corporate infrastructure devices (not shown). Note, network interface 540 may be included within programmable control device 510 or be external to programmable control device 510. In either case, programmable control device 510 may be communicatively coupled to network interface 540. Also note, program storage device 580 represents any form of non-volatile storage including, but not limited to, all forms of optical and magnetic storage elements including solid-state storage.

Program control device 510 may be included in a computing device and be programmed to perform methods in accordance with this disclosure. Program control device 510 may itself comprise processor unit (PU) 520, input-output (I/O) interface 550 and memory 530. Processing unit 520 may include any programmable control device including, for example, processors of an IBM mainframe (such as a quad-core z10 mainframe microprocessor). Alternatively, in non-mainframe systems examples of processing unit 520 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid state memory. One of ordinary skill in the art will also recognize that PU 520 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 4 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of managing an allocation of computing resources allocated from a plurality of groups of computing resources, the method comprising:
   determining an expected requirement of computing resources over a time period for usage from a first group of computing resources;
   obtaining a metric indicating an available capacity of the first group of computing resources over the time period;
   determining an expected shortfall time and an expected shortfall in the available capacity of the first group of computing resources at the expected shortfall time;
   calculating a cost associated with combining the first group of computing resources with the second group of computing resources;
   analyzing the calculated cost to determine a requirement for combining the first group of computing resources with the second group of computing resources;
   combining the first group of computing resources with the second group of computing resources if the analysis of the calculated cost indicates a requirement to combine the first group of computing resources with the second group of computing resources prior to the expected shortfall time and responsive to determining the expected shortfall in the available capacity of the first group of computing resources; and
   not combining the first group of computing resources with the second group of computing resources if the analysis of the calculated cost indicates no requirement to combine the first group of computing resources with the second group of computing resources prior to the expected shortfall.

2. The method of claim 1, further comprising:
   providing an indication to allocate computing resources from the second group of computing resources to a requestor that has requested resources from the first group of computing resources at a time after forming the larger group of computing resources.

3. The method of claim 1, wherein the larger group of computing resources comprises resources from only computing resources internal to an organization of a requestor.

4. The method of claim 1, wherein the second group of computing resources includes resources from computing resources external to an organization of a requestor.

5. The method of claim 1, wherein combining the first group of computing resources with the second group of computing resources is performed without re-balancing between the first group of computing resources and the second group of computing resources.

6. The method of claim 1, further comprising:
receiving, at the first group of computing resources, an allocation request for computer resources from a requestor; and
responding to the allocation request with computing resources from the second group of computing resources.

7. The method of claim 1, wherein calculating the cost comprises calculating based on factors selected from the group consisting of loss of reputation, loss of customers, and loss of profit from unfulfilled requests.

8. The method of claim 1, wherein calculating the cost comprises determining the cost associated with combining the first group of computing resources with the second group of computing resources using a service broker and reverse auction techniques.

9. The method of claim 1, further comprising:
determining a time to combine the first group of computing resources with the second group of computing resources using capacity planning techniques to derive an indication of nonscheduled expected change in allocation of resources in addition to a scheduled expected change.

10. A method of managing an allocation of computing resources allocated from a plurality of groups of computing resources, the method comprising:
determining an expected requirement of computing resources over a time period for usage from a first group of computing resources;
obtaining a metric indicating an available capacity of the first group of computing resources over the time period;
determining an expected shortfall time and an expected shortfall in the available capacity of the first group of computing resources at the expected shortfall time;
prior to the expected shortfall time and responsive to determining the expected shortfall in the available capacity of the first group of computing resources, combining the first group of computing resources with a second group of computing resources to form a larger group of computing resources; and
calculating a time to combine the first group of computing resources with the second group of computing resources prior to the expected shortfall time to be by an amount substantially equal to an average length of time to service a request for the first group of computing resources multiplied by an indication of the expected shortfall in the available capacity of the first group of computing resources divided by an indication of existing capacity of the first group of computing resources.

11. A computer system, the computer system comprising:
one or more processing units, wherein the one or more processing units are programmed with a placement engine function to execute on the one or more processing units, the placement engine function directing an allocation of cloud resources, selected from a plurality of computer resource clouds, based on an allocation method, the allocation method comprising:
receiving a request from a requestor for resources from a first cloud;
responsive to the request, determining an expected requirement of computing resources over a time period for usage from the first cloud;
obtaining a metric indicating an available capacity of the first cloud over the time period;
determining an expected shortfall time and an expected shortfall in the available capacity at the first cloud at the expected shortfall time;
determining resources suitable to satisfy the request are available from the first cloud at a time of the request;
calculating a cost associated with allocating resources from a second cloud;
determining the cost of allocation is less if resources are allocated from the second cloud than if resources are allocated from the first cloud;
providing an indication to allocate resources suitable to satisfy the request from the second cloud; and
allocating the resources from the second cloud prior to the expected shortfall.

12. The computer system of claim 11, wherein the allocation method of the placement engine further comprises:
receiving an indication of a first time to begin performing the act of determining an overall cost of allocation, the first time representative of a time prior to the expected shortfall of resources in the first cloud.

13. The computer system of claim 12, wherein the first time is prior to time of the expected shortfall by an amount of time substantially equal to an average length of time to service a request for the first cloud multiplied by an indication of an expected shortfall amount divided by an indication of existing capacity of the first cloud.

14. A non-transitory computer readable medium comprising computer readable instructions stored thereon to cause a processing device to perform the method of claim 1.

15. A computer system comprising one or more programmable control devices communicatively coupled to each other and to a computer network, wherein the one or more programmable control devices are programmed to perform the method of claim 1.

16. A computer network comprising:
a plurality of processing units communicatively coupled to a computer network;
a first processing unit configured to perform at least a portion of the method of claim 1 wherein the entire method of claim 1 is performed collectively by the plurality of processing units.

17. A non-transitory computer readable medium comprising computer readable instructions stored thereon to cause a processing device to perform a placement engine function, the placement engine function directing an allocation of cloud resources, selected from a plurality of computer resource clouds, based on an allocation method, the allocation method comprising:
receiving a request from a requestor for resources from a first cloud;
responsive to the request, determining an expected requirement of computing resources over a time period for usage from the first cloud;
obtaining a metric indicating an available capacity of the first cloud over the time period;
determining an expected shortfall time and an expected shortfall in the available capacity at the first cloud at the expected shortfall time;
determining resources suitable to satisfy the request are available from the first cloud at a time of the request;

calculating a cost associated with allocating resources from a second cloud;
determining the cost of allocation is less if resources are allocated from the second cloud than if resources are allocated from the first cloud;
providing an indication to allocate resources suitable to satisfy the request from the second cloud; and
allocating the resources from the second cloud prior to the expected shortfall.

* * * * *